(12) United States Patent
John et al.

(10) Patent No.: US 10,344,171 B2
(45) Date of Patent: Jul. 9, 2019

(54) DISPERSION OF CARBONACEOUS NANOPARTICLES AND METHOD OF MAKING THE SAME

(75) Inventors: Hendrik John, Celle (DE); Claus-Peter Klages, Braunschweig (DE); Sven Hartwig, Hambühren (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1553 days.

(21) Appl. No.: 13/446,218

(22) Filed: Apr. 13, 2012

(65) Prior Publication Data

US 2013/0102719 A1 Apr. 25, 2013

Related U.S. Application Data

(60) Provisional application No. 61/476,050, filed on Apr. 15, 2011.

(51) Int. Cl.
| | | |
|---|---|---|
| *C09D 5/00* | (2006.01) | |
| *C09D 7/45* | (2018.01) | |
| *C09D 17/00* | (2006.01) | |
| *C08J 7/04* | (2006.01) | |
| *B82Y 30/00* | (2011.01) | |

(52) U.S. Cl.
CPC .......... *C09D 5/00* (2013.01); *C08J 7/045* (2013.01); *C09D 7/45* (2018.01); *C09D 17/005* (2013.01); *B82Y 30/00* (2013.01); *C08J 2455/00* (2013.01); *C08K 2201/005* (2013.01); *C08K 2201/011* (2013.01); *Y10S 977/734* (2013.01); *Y10S 977/75* (2013.01); *Y10S 977/752* (2013.01); *Y10S 977/773* (2013.01)

(58) Field of Classification Search
USPC ........................................ 524/495
See application file for complete search history.

(56) References Cited

U.S. PATENT DOCUMENTS

| | | | |
|---|---|---|---|
| 4,872,885 A | 10/1989 | Tsubakimoto et al. | |
| 6,610,776 B2* | 8/2003 | Laubender | C04B 41/009 |
| | | | 428/463 |
| 2001/0031826 A1 | 10/2001 | Laubender et al. | |
| 2010/0093926 A1 | 4/2010 | Richards et al. | |
| 2011/0003907 A1 | 1/2011 | Choi et al. | |
| 2011/0143143 A1* | 6/2011 | Qi | C04B 26/08 |
| | | | 428/421 |

FOREIGN PATENT DOCUMENTS

| | | |
|---|---|---|
| EP | 1132436 | 9/2001 |
| EP | 1762580 A2 | 3/2007 |
| JP | 2010247099 A | 11/2010 |

OTHER PUBLICATIONS

Spitalsky et al., Carbon Nanotube-Polymer Composites: Chemistry, Processing, Mechanical and Electrical Properties, Progess in Science 35, 2010, pp. 357-401.*
Kevin A. Wepasnick et al., "Surface and structural characterization of multi-walled carbon nanotubes following different oxidative treatments," Carbon 49 (2011), pp. 24-36.
International Search Report and Written Opinion; International Application No. PCT/US2012/033582; International Filing Date: Apr. 13, 2012; dated Oct. 29, 2012; 10 pages.
Rice Univeristy, [online]; [retrieved on Sep. 14, 2012]; retrieved from the Internet http://chemistry.rice.edu/FacultyDetail.aspx?RiceID= 1027. James M. Tour, Department of Chemistry, 13p.
EP Office Action for European Application No. 12771613.2, dated Oct. 11, 2016; 5 pages.

* cited by examiner

*Primary Examiner* — Ling Siu Choi
*Assistant Examiner* — Thuy-Ai N Nguyen
(74) *Attorney, Agent, or Firm* — Cantor Colburn LLP

(57) ABSTRACT

A dispersion includes a carbonaceous nanoparticle, a dispersant including a graft polymer having a poly(alkylene glycol) side chain, and a polar solvent. An article coated with the dispersion and a method of making the dispersion are disclosed.

27 Claims, No Drawings

DISPERSION OF CARBONACEOUS NANOPARTICLES AND METHOD OF MAKING THE SAME

CROSS REFERENCE TO RELATED APPLICATIONS

This application claims the benefit of an earlier filing date from U.S. Provisional Application Ser. No. 61/476,050, filed Apr. 15, 2011, the entire disclosure of which is incorporated herein by reference.

BACKGROUND

A downhole environment such as, for example, an oil or gas well in an oilfield or undersea environment, a gas sequestration well, a geothermal borehole, or other such environment, may expose equipment used downhole, such as packers, blow out preventers, drilling motor, drilling bit, and the like, to conditions which may affect the integrity or performance of the element and tools.

Where the article is an element having a rubber or plastic part or coating, downhole conditions may cause, for example, swelling by uptake of hydrocarbon oil, water or brine, or other materials found in such environments, and which can thereby weaken the structural integrity of the element or cause the element to have poor dimensional stability, resulting in difficulty in placing, activating, or removing the element. Likewise, where the element includes metallic components, these components may be exposed to harsh, corrosive conditions due to the presence of materials such as hydrogen sulfide and brine, which may be found in some downhole environments.

Protective coatings, and improved methods of forming protective coatings, are therefore desirable for use with such downhole elements, particularly coatings having improved barrier properties to resist exposure to a variety of different environmental conditions and materials found in downhole environments.

SUMMARY

The above and other deficiencies of the prior art are overcome by a dispersion, comprising a carbonaceous nanoparticle, a dispersant comprising a graft polymer having a poly(alkylene glycol) side chain, and a polar solvent.

In another embodiment, a coating for an article comprises the dispersion.

In another embodiment, a method of making a dispersion, comprises combining a carbonaceous nanoparticle, and a dispersant comprising a graft polymer having a poly(alkylene glycol) side chain, in a polar solvent.

In another embodiment, a method of coating an article, comprises combining a carbonaceous nanoparticle and a dispersant comprising a graft polymer having a poly(alkylene glycol) side chain in a polar solvent, to form a dispersion, and contacting the dispersion to the article.

DETAILED DESCRIPTION OF THE INVENTION

Disclosed herein is a dispersion of carbonaceous nanoparticles (CNPs) useful for forming a coating on a surface of an article for a downhole element. The dispersion is formed and stabilized by inclusion of a graft polymeric dispersant having poly(alkylene glycol) side chains. The dispersion is prepared in a polar solvent, such as water, a polar protic solvent such as an alcohol, or a polar aprotic solvent such as a lactone or lactam. The dispersion, formed using the combination of the carbonaceous nanoparticle and the graft polymeric dispersant, shows improved stability relative to other dispersants, such as graft polymers with side chains other than poly(alkylene glycols). Poly(alkylene glycol) side chains have a high steric bulk, which, after dispersing the carbonaceous nanoparticles, hinders the carbonaceous nanoparticles from re-agglomerating. Such dispersants are particularly useful in dispersing carbonaceous nanoparticles in aqueous solution, with a high ionic strength.

The dispersion, comprises a carbonaceous nanoparticle, a dispersant comprising a graft polymer having a poly(alkylene glycol) side chain, and a polar solvent.

The carbonaceous nanoparticles may have an average particle size (largest average dimension) of about 1 nanometer (nm) to about 25 micrometers (μm). In some embodiments, the carbonaceous nanoparticles have an average particle size of less than about 1 micrometer (μm), and more specifically a largest average dimension less than or equal to about 500 nanometer (nm), and still more specifically less than or equal to about 250 nm, where particle sizes of greater than about 250 nm to less than about 1 μm may also be referred to in the art as "sub-micron sized particles." In other embodiments, the average particle size may be greater than or equal to about 1 nm, specifically 1 to about 250 nm, and more specifically about 1 to about 100 nm. In still other embodiments, the average particle size of the carbonaceous nanoparticle (as where the CNP is a graphene) may be greater than or equal to 1 μm, specifically 1 to 25 μm, more specifically 1 to 20 μm, still more specifically 1 to 10 μm. As used herein, "average particle size" and "average largest dimension" may be used interchangeably, and refer to particle size measurements based on number average particle size measurements, which may be routinely obtained by laser light scattering methods such as static or dynamic light scattering (SLS or DLS, respectively). The carbonaceous nanoparticles may have an aspect ratio of greater than about 10, and more particularly, greater than about 50, yet even more particularly, greater than about 100, and further more particularly, greater than about 500.

Carbonaceous nanoparticles include nanographite, graphene, fullerenes, nanotubes, nanodiamonds, or a combination comprising at least one of the foregoing.

Nanographite is a nano-scale cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction.

Graphene, sometimes referred to herein as nanographene, includes both graphene having an average largest dimension of greater than or equal to 1 μm, and nanographene having an average largest dimension of less than 1 μm. Graphenes, including nanographene, are effectively two-dimensional particles of nominal thickness, having a stacked structure of one or more layers of fused hexagonal rings with an extended delocalized π-electron system, layered and weakly bonded to one another through π-π stacking interaction. An exemplary graphene may have an average particle size of 1 to 5 μm, and specifically 2 to 4 μm. Graphenes may have an average smallest particle size (smallest average dimension, i.e., thickness) of less than or equal to about 50 nm, more specifically less than or equal to about 10 nm, and still more specifically less than or equal to 5 nm. Graphene (including nanographene) may have less than about 50 single sheet layers, specifically less than about 10 single sheet layers, and more specifically less than or equal to about 5 single sheet layers, or may be a single sheet thick.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes may include carbon nanotubes, inorganic nanotubes, metallated nanotubes, or a combination comprising at least one of the foregoing. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multiwalled nanotubes (MWNTs).

Nanodiamonds are diamond particles having an average particle size of less than one micrometer (μm). The nanodiamonds used herein may be from a naturally occurring source, such as a by-product of milling or other processing of natural diamonds, or may be synthetic, prepared by any suitable commercial method. Nanodiamonds may be used as received, or may be sorted and cleaned by various methods to remove contaminants and non-diamond carbon phases that may be present, such as residues of amorphous carbon or graphite.

In some embodiments, the carbonaceous nanoparticles are unfunctionalized, i.e., have not been modified synthetically to include any non-native functional groups. In other embodiments, the carbonaceous nanoparticles can be derivatized to introduce a functional group on the surface and/or edges of the carbonaceous nanoparticles, to increase dispersibility in and interaction with various matrices including polymer resin matrix. Carbonaceous nanoparticles, such as, for example, nanotubes or graphenes, may be derivatized to include functional groups such as, for example, carboxy (e.g., carboxylic acid groups), epoxy, ether, ester, ketone, amine, hydroxy, alkyl, aryl, aralkyl including benzyl, lactone, other monomeric or polymeric groups including functionalized polymeric or oligomeric groups, and the like, and combinations comprising at least one of the foregoing groups.

The dispersant is a polymeric dispersant having poly (alkylene glycol) sidechains grafted to a polymer backbone. Polymer backbones may include those based on a polyester, a poly(meth)acrylate, a polystyrene, a poly(styrene-(meth) acrylate), a polycarbonate, a polyamide, a polyimide, a polyurethane, a polyvinyl alcohol, or a copolymer comprising at least one of these polymeric backbones. As used herein, "(meth)acrylate" and "(meth)acrylic" mean monomers based on methacrylic or acrylic acids or methacrylic or acrylic acid esters including methacrylates and acrylates, or a combinations of the two. Particularly useful polymer backbones include those based on poly(meth)acrylate, poly (styrene), poly(styrene-acrylates), and polyvinylalcohols. Of these, poly(meth)acrylates, including polymethacrylic acids and polyacrylic acids, and copolymers thereof with other monomers, are preferred, such as homo and co-polymers of (meth)acrylic acid, $C_{1-20}$ (meth)acrylate monomers, and styrene are preferred.

A poly(alkylene glycol) sidechain is grafted onto the polymer backbone. The poly(alkylene glycol) sidechain has a number averaged molecular weight ($M_n$) of about 100 to about 50,000 g/mol, specifically about 200 to about 10,000 g/mol, and still more specifically about 300 to about 5,000 g/mol. The poly(alkylene glycol) comprises $C_{2-20}$ alkyleneoxy units, and includes at least two of the alkyleneoxy repeating units. Exemplary sidechains comprises poly(ethylene glycol), poly(propylene glycol), poly(ethylene glycol-propylene glycol), or a combination comprising at least one of the foregoing sidechains. The poly(alkylene glycol) may have an end group including hydroxy, carboxyl, $C_{1-20}$ carboxylate, $C_{1-20}$ alkoxy, $C_{1-20}$ heteroalkoxy, $C_{3-20}$ cycloalkoxy, $C_{3-20}$ heterocycloalkoxy, $C_{6-20}$ aryloxy, $C_{3-20}$ heteroaralkoxy, $C_{7-20}$ aralkoxy, $C_{4-20}$ heteroaralkoxy or a combination comprising at least one of the foregoing end groups. Preferably, the end group is a hydroxy group.

The dispersant may have a weight averaged molecular weight ($M_w$) of about 1,000 to about 100,000 g/mol, about 10,000 to about 75,000 g/mol, more specifically about 15,000 to about 60,000 g/mol, and still more specifically about 20,000 to about 50,000 g/mol. In some embodiments, the dispersant may have an $M_w$ of about 1,000 to about 1,000,000 g/mol, about 20,000 to about 800,000 g/mol, more specifically about 50,000 to about 700,000 g/mol, and still more specifically about 75,000 to about 500,000 g/mol.

The dispersant a poly(meth)acrylate having poly(ethylene glycol) sidechains with hydroxy end groups, a polystyrene having poly(ethylene glycol) sidechains with hydroxy end groups, a poly(styrene-(meth)acrylate) having poly(ethylene glycol) sidechains with hydroxy end groups, a polycarbonate having poly(ethylene glycol) sidechains with hydroxy end groups, a polyvinylalcohol having poly(ethylene glycol) sidechains with hydroxy end groups, or a combination comprising at least one of the foregoing dispersants. Useful dispersants include comb-type polyelectrolytes based on a poly(meth)acrylic acid having polyethylene glycol sidechains, including those marketed by BASF under the tradename of MELPERS™, such as MELPERS™ 9560.

The solvent for forming the dispersion may include polar protic solvents, polar aprotic solvents, or a combination comprising at least one of these. The solvent may include an electrolyte in the form of a salt, or a pH adjustment (e.g., by addition of acid or base), or buffering, depending on the application intended for the dispersion.

Exemplary solvents for dispersing the carbonaceous nanoparticles include water including buffered or pH adjusted water; alcohols, such as methanol, ethanol, propanol, isopropanol, butanol, t-butanol, octanol, cyclohexanol, ethylene glycol, ethylene glycol methyl ether, ethylene glycol ethyl ether, ethylene glycol butyl ether, propylene glycol, propylene glycol methyl ether, propylene glycol ethyl ether, diethylene glycol, triethylene glycol, dipropylene glycol, tripropylene glycol, cyclohexanol, and the like; polar aprotic solvents such as dimethylsulfoxide, sulfolane, ethylene carbonate, propylene carbonate, N,N-dimethylformamide, N,N-dimethylacetamide, N-methylpyrrolidone, gamma butyrolactone, and the like; or a combination comprising at least one of the foregoing solvents.

The coating formulation may also include additional components such as common fillers and/or other nanoparticles, and/or other additives such as dispersants including ionic and/or non-ionic surfactants, coupling agents such as silane coupling agents, or the like. In another embodiment, the nanoparticle is suspended in a solvent, where no additive is included.

The dispersion may further include an additive such as an additional dispersant not identical to the first, electrolytes, fillers and/or nanoparticles, emulsifiers, stabilizers, and the like.

The dispersion may have a total solids of carbon nanoparticle and dispersant of from 0.1 to 20 wt %, specifically 0.2 to 15 wt %, more specifically 0.5 to 12 wt %, and still more specifically 1.0 to 10 wt %, based on the total weight of the dispersion. The weight ratio of carbonaceous nanoparticle to dispersant may be from about 1:100 to about 100:1.

A method of making a dispersion, includes combining a carbonaceous nanoparticle, and the dispersant comprising a graft polymer having a poly(alkylene glycol) side chain, in a polar solvent. Combining may be effected by any suitable method known in the art, such as by high shear mixing, sonication, or a combination comprising at least one of these.

In another embodiment, a method of coating an article, includes combining a carbonaceous nanoparticle and a dispersant comprising a graft polymer having a poly(alkylene glycol) side chain, in a polar solvent, to form a dispersion, and contacting the dispersion to the article. Contacting may be carried out one or more times. The dispersant is advantageous where deposition of multiple layers of carbonaceous nanoparticle are applied in a layer-by-layer process (i.e., with successive coatings). The dispersion is particularly advantageous for use in plating operations in which the dispersion also contains metallic cations to be plated, for example, where the carbonaceous nanoparticle and metal plate are applied simultaneously. The use of the particular dispersant unexpectedly provides significantly greater dispersion stability in the presence of the carbonaceous nanoparticles and metal cations, relative to similar dispersions that do not use dispersants having poly(alkylene glycol) sidechains.

The coating of the carbonaceous nanoparticles may formed by contacting the dispersion to a surface of the article. The surface to be coated may be initially treated as, for example, by corona treatment, or may be first coated with a primer layer. The dispersion may be applied by any suitable means, including dip coating, spray coating, casting, or the like, and may be carried out with other components or intervening steps such as drying, curing, and application of alternating layers of e.g., binder polymers, or the like, interspersed with drying and/or curing steps. Curing may be effected by a thermal cure; irradiation using ionizing or non-ionizing radiation including visible or ultraviolet light, e-beam, x-ray, or the like; chemical curing as by e.g., exposure to an active curing agent such as an acid or base; or the like; or a combination of these curing methods. A single coating layer of the carbonaceous nanoparticle, or multiple treatments to apply multiple layers of the carbonaceous nanoparticles, may be included. The surface to be coated may be initially treated as, for example, by corona treatment, or may be first coated with a primer layer. The coating may thus provide a protective, solvent and/or abrasion resistant surface for the article.

The article to be coated may be metal, plastic, or elastomeric. In an embodiment, the coated article may be a downhole element. Various elements which may be coated with the nano-coating include, for example, a packer element, a blow out preventer element, a torsional spring of a sub surface safety valve, a submersible pump motor protector bag, a blow out preventer element, a sensor protector, a sucker rod, an O-ring, a T-ring, a gasket, a pump shaft seal, a tube seal, a valve seal, a seal for an electrical component, an insulator for an electrical component, a seal for a drilling motor, or a seal for a drilling bit.

The article is wholly or partially coated with the nano-coating. When coated with the nano-coating, these articles and elements may have improved resistance to permeation relative to uncoated elements, or to elements coated with polymer and/or standard filler-containing coatings that do not include nanoparticles such as graphene. The nano-coated articles can be used under challenging conditions such as those experienced in undersea or sub-terrain applications.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A dispersion, comprising
   a carbonaceous nanoparticle,
   a dispersant comprising a graft polymer having a poly(alkylene glycol) side chain,
   metallic cations, and
   a polar solvent,
   wherein the dispersant has a polymeric backbone comprising a polyester, a polystyrene, a poly(styrene-(meth)acrylate), a polycarbonate, a polyamide, a polyimide, a polyurethane, a polyvinyl alcohol, or a copolymer comprising at least one of these polymeric backbones and the poly(alkylene glycol) side chain has an end group comprising hydroxy, carboxyl, $C_{1-20}$ carboxylate, or a combination comprising at least one of the foregoing end groups,
   wherein the dispersant provides greater dispersion stability in the presence of the carbonaceous nanoparticle and metallic cations, relative to a reference dispersion that does not use dispersants having poly(alkylene glycol) sidechains.

2. The dispersion of claim 1, wherein the carbonaceous nanoparticle is a nanographite, graphene, fullerene, nanotube, nanodiamond, or a combination comprising at least one of the foregoing.

3. The dispersion of claim 2, wherein the nanotube is a single walled carbon nanotube, multiwalled carbon nanotube, or a combination comprising at least one of the foregoing.

4. The dispersion of claim 2, wherein the carbonaceous nanoparticle is derivatized to have a functional group.

5. The dispersion of claim 4, wherein the functional group includes carboxy, epoxy, ether, ester, ketone, amine, hydroxy, alkoxy, alkyl, aryl, aralkyl, lactone, functionalized polymeric or oligomeric groups, or a combination comprising at least one of the forgoing functional groups.

6. The dispersion of claim 1, wherein an average particle size of nanoparticle is 1 nanometer to 5 micrometers.

7. The dispersion of claim 1, wherein the poly(alkylene glycol) sidechain has an $M_n$ of about 100 to about 50,000 g/mol.

8. The dispersion of claim 1, wherein the poly(alkylene glycol) comprises at least two alkylene glycol repeating units.

9. The dispersion of claim 1, wherein the dispersant has an $M_w$ of about 1,000 to about 100,000 g/mol.

10. The dispersion of claim 1, wherein the dispersant has an $M_w$ of about 1,000 to about 1,000,000 g/mol.

11. The dispersion of claim 1, wherein the sidechain comprises poly(ethylene glycol), poly(propylene glycol), poly(ethylene glycol-propylene glycol), or a combination comprising at least one of the foregoing sidechains.

12. The dispersion of claim 1, wherein the dispersant comprises a polystyrene having poly(ethylene glycol) sidechains with hydroxy end groups, a poly(styrene-(meth)acrylate) having poly(ethylene glycol) sidechains with hydroxy end groups, a polycarbonate having poly(ethylene glycol) sidechains with hydroxy end groups, a polyvinylalcohol having poly(ethylene glycol) sidechains with hydroxy end groups, or a combination comprising at least one of the foregoing dispersants.

13. The dispersion of claim 1, wherein the polar solvent comprises water.

14. The dispersion of claim 1, further comprising an electrolyte.

15. A coating for an article, prepared from the dispersion of claim 1.

16. A coated article comprising the coating of claim 15, wherein the article is metal, plastic, or elastomeric, and the coated article is a downhole element.

17. A method of making a dispersion, comprising
combining a carbonaceous nanoparticle,
metallic cations, and
a dispersant comprising a graft polymer having a poly(alkylene glycol) side chain,
in a polar solvent,
wherein the dispersant has a polymeric backbone comprising a polyester, a polystyrene, a poly(styrene-(meth)acrylate), a polycarbonate, a polyamide, a polyimide, a polyurethane, a polyvinyl alcohol, or a copolymer comprising at least one of these polymeric backbones and the poly(alkylene glycol) side chain has an end group comprising hydroxy, carboxyl, $C_{1-20}$ carboxylate, or a combination comprising at least one of the foregoing end groups, and
the dispersant provides greater dispersion stability in the presence of the carbonaceous nanoparticle and metallic cations, relative to a reference dispersion that does not use dispersants having poly(alkylene glycol) sidechains.

18. The method of claim 17, wherein combining comprises high shear mixing, sonication, or a combination comprising at least one of these.

19. A method of coating an article, comprising
combining a carbonaceous nanoparticle and a dispersant comprising a graft polymer having a poly(alkylene glycol) side chain and metallic cations, in a polar solvent, to form a dispersion, and
contacting the dispersion to the article,
wherein the dispersant has a polymeric backbone comprising a polyester, a polystyrene, a poly(styrene-(meth)acrylate), a polycarbonate, a polyamide, a polyimide, a polyurethane, a polyvinyl alcohol, or a copolymer comprising at least one of these polymeric backbones and the poly(alkylene glycol) side chain has an end group comprising hydroxy, carboxyl, $C_{1-20}$ carboxylate, or a combination comprising at least one of the foregoing end groups, and
the dispersant provides greater dispersion stability in the presence of the carbonaceous nanoparticle and metallic cations, relative to a reference dispersion that does not use dispersants having poly(alkylene glycol) sidechains.

20. The method of claim 19, wherein contacting is by immersing, spray coating, casting, or a combination of these methods, and wherein contacting is carried out one or more times.

21. The coated article of claim 16, wherein the coated article is a packer element, a blow out preventer element, a torsional spring of a sub surface safety valve, a submersible pump motor protector bag, a blow out preventer element, a sensor protector, a sucker rod, an O-ring, a T-ring, a gasket, a pump shaft seal, a tube seal, a valve seal, a seal for an electrical component, an insulator for an electrical component, a seal for a drilling motor, or a seal for a drilling bit.

22. The coated article of claim 16, wherein the article is metal.

23. The dispersion of claim 1, wherein the polymeric backbone of the dispersant is free of a polyurethane.

24. The dispersion of claim 1, wherein the polar solvent comprises an alcohol.

25. The dispersion of claim 1, wherein the polar solvent comprises lactone, lactam, dimethylacetamide, N-methylpyrrolidone, or a combination comprising at least one of the foregoing.

26. The dispersion of claim 1, wherein the dispersion has a total solids of carbon nanoparticle and dispersant of from 0.1 to 20 wt %, based on the total weight of the dispersion.

27. The dispersion of claim 19, further comprises conducting a plating operation wherein the dispersion comprises metallic cations to be plated.

* * * * *